United States Patent
Peters et al.

(10) Patent No.: US 11,104,619 B2
(45) Date of Patent: Aug. 31, 2021

(54) MIXTURE FOR TREATING FERTILIZERS CONTAINING UREA

(71) Applicant: EuroChem Agro GmbH, Mannheim (DE)

(72) Inventors: Nils Peters, Frankenthal (DE); Thomas Mannheim, Untermünkheim (DE)

(73) Assignee: EuroChem Agro GmbH, Mannheim (DE)

( * ) Notice: Subject to any disclaimer, the term of this patent is extended or adjusted under 35 U.S.C. 154(b) by 682 days.

(21) Appl. No.: 15/737,791

(22) PCT Filed: Jun. 22, 2016

(86) PCT No.: PCT/EP2016/064408
§ 371 (c)(1),
(2) Date: Oct. 23, 2018

(87) PCT Pub. No.: WO2016/207210
PCT Pub. Date: Dec. 29, 2016

(65) Prior Publication Data
US 2019/0055169 A1  Feb. 21, 2019

(30) Foreign Application Priority Data
Jun. 22, 2015 (EP) .................................. 15173134

(51) Int. Cl.
*C05G 3/90* (2020.01)
*C05G 5/30* (2020.01)
*A01C 21/00* (2006.01)
*C05C 9/00* (2006.01)

(52) U.S. Cl.
CPC ................ *C05G 5/37* (2020.02); *A01C 21/00* (2013.01); *C05C 9/00* (2013.01); *C05G 3/90* (2020.02); *Y02P 60/21* (2015.11)

(58) Field of Classification Search
CPC .... C05G 5/37; C05G 3/90; C05G 3/00; A01C 21/00; C05C 9/00; C05C 3/005; C05C 1/02; C05C 1/00; Y02P 60/21; C09K 15/20; C07D 231/12; C05B 7/00
See application file for complete search history.

(56) References Cited

U.S. PATENT DOCUMENTS

| | | | |
|---|---|---|---|
| 4,530,714 A | 7/1985 | Kolc et al. | |
| 5,770,771 A | 6/1998 | Sulzer et al. | |
| 5,951,736 A | 9/1999 | Grabarse et al. | |
| 5,972,064 A | 10/1999 | Rittinger et al. | |
| 6,066,190 A | 5/2000 | Grabarse et al. | |
| 6,139,596 A | 10/2000 | Barth et al. | |
| 6,488,734 B1 | 12/2002 | Barth et al. | |
| 10,640,431 B2 | 5/2020 | Peters et al. | |
| 2010/0206030 A1 | 8/2010 | Whitehurst et al. | |
| 2011/0154874 A1* | 6/2011 | Rahn ........................ | C05G 5/30 71/21 |
| 2012/0252668 A1 | 10/2012 | Gewehr et al. | |
| 2014/0037570 A1 | 2/2014 | Whitehurst et al. | |
| 2014/0174140 A1 | 6/2014 | Ortiz-Suarez et al. | |
| 2014/0360239 A1* | 12/2014 | Kleine-Kleffmann .... | C05C 9/00 |
| 2015/0101379 A1 | 4/2015 | Gabrielson et al. | |
| 2015/0148231 A1 | 5/2015 | Nave et al. | |
| 2016/0168042 A1 | 6/2016 | Tironi Gallardo | |
| 2017/0050894 A1 | 2/2017 | Peters et al. | |
| 2020/0223764 A1 | 7/2020 | Peters et al. | |

FOREIGN PATENT DOCUMENTS

| | | |
|---|---|---|
| BY | 4281 C1 | 3/2002 |
| CN | 101945837 A | 1/2011 |
| CN | 102260123 A | 11/2011 |
| CN | 102557838 A | 7/2012 |
| DE | 19631764 A1 | 2/1998 |
| DE | 10164103 C1 | 1/2003 |
| DE | 10164104 C1 | 6/2003 |
| DE | 102005015362 A1 | 11/2005 |
| DE | 102007062614 A1 | 6/2009 |
| EA | 199900093 A1 | 8/1999 |
| EP | 0119487 A1 | 9/1984 |
| EP | 0236972 A2 | 9/1987 |
| EP | 1120388 A1 | 8/2001 |
| EP | 0917526 B1 | 12/2001 |
| EP | 1182220 A1 | 2/2002 |
| EP | 1820788 A1 | 8/2007 |
| EP | 3029011 A1 | 6/2016 |
| RU | 2043026 C1 | 9/1995 |
| WO | WO-96/24566 A1 | 8/1996 |
| WO | WO-00/58317 A1 | 10/2000 |
| WO | WO-00/61522 A1 | 10/2000 |
| WO | WO-01/87898 A2 | 11/2001 |

(Continued)

OTHER PUBLICATIONS

Abd El Halim et al., "3-[2-(3,5-dimethylpyrazolyl)] succinic anhydride: synthone for the synthesis of some heterocycles with potential pharmaceutical activity," Monatshefte für Chemie 125:1437-42 (1994).

(Continued)

*Primary Examiner* — Jennifer A Smith
(74) *Attorney, Agent, or Firm* — Clark & Elbing LLP

(57) ABSTRACT

The invention relates to a synergistic mixture of urease inhibitor and nitrification inhibitor for the treatment of urea-containing fertilizers, more particularly having an improved urease-inhibitory effect, to the use thereof, and to urea-containing fertilizers comprising said mixture.

12 Claims, No Drawings

(56) References Cited

FOREIGN PATENT DOCUMENTS

| WO | WO-02/083697 | A1 | 10/2002 | |
|---|---|---|---|---|
| WO | WO-2006/010389 | A1 | 2/2006 | |
| WO | WO-2009/079994 | A2 | 7/2009 | |
| WO | WO-2011/032904 | A1 | 3/2011 | |
| WO | WO-2013/121384 | A2 | 8/2013 | |
| WO | WO-2014/053401 | A2 | 4/2014 | |
| WO | WO-2015/086823 | A2 | 6/2015 | |
| WO | WO-2015086823 | A2 * | 6/2015 | ............... C05G 3/90 |
| WO | WO-2017/218618 | A1 | 12/2017 | |

OTHER PUBLICATIONS

Caplus Accession for XP-002741584 (1 page).

International Search Report and Written Opinion for International Application No. PCT/EP2014/077570, dated Jul. 27, 2015 (29 pages).

International Search Report for International Application No. PCT/EP2016/064408, dated Sep. 16, 2016 (5 pages).

Kong et al., "Ecological engineering of Environment," Shanghai Jiao Tong University Press, first edition in Apr. 2015, pp. 53-54. English summary included.

Notice of Allowance for Belarus Application No. 20160269, dated Jan. 21, 2020 (4 pages).

Aurepio, "Calcium ammonium nitrate," <https://web.archive.org/web/20130811073934/http://www.aurepio.pl/en/nitrogen-fertilizers/calcium-ammonium-nitrate-s251>, dated Aug. 11, 2013, retrieved Oct. 22, 2018, (2 pages).

Barth et al., "Effectiveness of 3,4-dimethylpyrazole phosphate as nitrification inhibitor in soil as influenced by inhibitor concentration, application form, and soil matric potential," Pedosphere. 18(3):378-85 (2008).

Di et al., "Inhibition of ammonium oxidation by a liquid formulation of 3,4-dimethylpyrazole phosphate (DMPP) compared with a dicyandiamide (DCD) solution in six new Zealand grazed grassland soils," J Soils Sediments 11(6):1032-9 (2011).

English translation of an Office Action for Chinese Application No. 201480074744.6, dated Nov. 30, 2018 (8 pages).

International Preliminary Report on Patentability for International Application No. PCT/EP2018/052200, dated Jan. 3, 2019 (9 pages).

International Search Report for International Application No. PCT/EP2018/052200, dated Apr. 26, 2018 (7 pages).

Zerulla et al., "3,4-dimethylpyrazole phosphate (DMPP)—a new nitrification inhibitor for agriculture and horticulture," Biol Fertil Soils. 34(2):79-84 (2001).

Huérfano et al., "The new nitrification inhibitor 3,4-dimethylpyrazole succinic (DMPSA) as an alternative to DMPP for reducing $N_2O$ emissions from wheat crops under humid Mediterranean conditions," European Journal of Agronomy. 80:78-87 (2016).

Yang et al., "Efficiency of two nitrification inhibitors (dicyandiamide and 3, 4-dimethypyrazole phosphate) on soil nitrogen transformations and plant productivity: a meta-analysis," Sci Rep. 6:22075 (2016).

* cited by examiner

MIXTURE FOR TREATING FERTILIZERS CONTAINING UREA

The invention relates to a synergistic mixture of urease inhibitor and nitrification inhibitor for the treatment of urea-containing fertilizers, more particularly having an improved urease-inhibitory effect, to the use thereof, and to urea-containing fertilizers comprising said mixture.

Worldwide, the predominant and further-increasing amount of the nitrogen used for fertilizing is employed in the form of urea or urea-containing fertilizers. Urea itself, however, is a form of nitrogen which is absorbed very little if at all, being hydrolyzed relatively rapidly by the enzyme urease, which is present ubiquitously in the soil, to form ammonia and carbon dioxide. In this process, in certain circumstances, gaseous ammonia is emitted to the atmosphere, and is then no longer available in the soil for the plants, thereby reducing the efficiency of the fertilization.

It is known that the degree of utilization of the nitrogen when using urea-containing fertilizers can be improved by delivering urea-containing fertilizers together with substances which are able to inhibit or decrease the enzymatic cleavage of urea (for a general review, see Kiss, S. Simihäian, M. (2002) Improving Efficiency of Urea Fertilizers by Inhibition of Soil Urease Activity, ISBN 1-4020-0493-1, Kluwer Academic Publishers, Dordrecht, The Netherlands). Among the most potent known urease inhibitors are N-alkylthiophosphoric triamides and N-alkylphosphoric triamides, which are described in EP 0 119 487, for example.

Additionally, mixtures of N-alkylthiophosphoric triamides such as N-(n-butyl)thiophosphoric triamide (NBPT) and N-(n-propyl)thiophosphoric triamide (NPPT) can be used.

These urease inhibitors are described in U.S. Pat. No. 4,530,714 and WO2009/079994, for example. In order for this class of compound to be able to act as a urease inhibitor, there must first be a conversion to the corresponding oxo form. That form reacts subsequently with the urease, causing its inhibition.

It is advisable to apply the urease inhibitors together with the urea onto or into the soil, since this ensures that the inhibitor comes into contact, together with the fertilizer, with the soil. The active compound may be incorporated in the urea by, for example, dissolving it into the melt prior to urea granulation or prilling. A process of this kind is described in U.S. Pat. No. 5,352,265, for example. A further option is to apply the active compound to the urea granules or prills, in the form of a solution, for example.

Corresponding processes for application, and suitable solvents, are described in EP-A-1 820 788, for example.

DE-A-10 2005 015 362 describes reaction products of NBPT and pyrazoles.

It is an object of the present invention to provide a mixture for the treatment of urea-containing fertilizers that allows a synergistic combination of urease inhibition and inhibition of nitrification.

In the mixture, the additional emission of ammonia that normally occurs is to be prevented by the inclusion of a nitrification inhibitor.

In comparison to urease inhibitors and nitrification inhibitors employed separately, the aim is to achieve a comparable effect at lower application rates.

Nitrogen losses on the part of the urea-containing fertilizer during application are to be prevented by means of the mixture according to the invention.

It is an object of the present invention, further, to provide a mixture for the treatment of urea-containing fertilizers, more particularly for urease inhibition, which, following application to urea-containing fertilizers, has a relatively long stable storage life, is more robust as it passes through various distribution stages, and protects the active compound applied to urea from decomposition or loss. The mixture is not to adversely affect the activity of the active compound.

This object is achieved in accordance with the invention by means of a mixture for the treatment of urea-containing fertilizers, comprising a) at least one (thio)phosphoric triamide of the general formula (I) and/or (thio)phosphoric diamide of the general formula (II)

$$R^1R^2N\text{—}P(X)(NH_2)_2 \quad (I)$$

$$R^1O\text{—}P(X)(NH_2)_2 \quad (II)$$

with the following definitions:

X is oxygen or sulfur, $R^1$ and $R^2$ independently of one another are hydrogen, in each case substituted or unsubstituted 2-nitrophenyl, $C_{1-10}$ alkyl, $C_{3-10}$ cycloalkyl, $C_{3-10}$ heterocycloalkyl, $C_{6-10}$ aryl, $C_{6-10}$ heteroaryl or diaminocarbonyl, it also being possible for $R^1$ and $R^2$, together with the nitrogen atom joining them, to form a 5- or 6-membered saturated or unsaturated heterocyclic radical, which optionally may also contain one or two further heteroatoms selected from the group consisting of nitrogen, oxygen and sulfur, as component A, b) 2-(N-3,4-dimethylpyrazole)succinic acid, possibly also in salt form, as component B, where components A and B are in a weight ratio in the range from 1:1 to 1:6. Optionally it is possible to make accompanying use of c) at least one compound containing an amino group or a substituted amino group and having a boiling point of more than 100° C., as component C.

The invention provides, moreover, for the use of the mixture as an additive and coating material for urea-containing nitrogen fertilizers.

The invention further provides for the use of the mixture for reducing the nitrogen losses in organic fertilizers, on pasture land or during the storage of liquid manure and for lowering the ammonia load in animal stalls.

The invention further provides a urea-containing fertilizer comprising the mixture according to the invention in an amount such that the total amount of components A and B, based on the urea present, is 0.001% to 0.5% by weight, preferably 0.02% to 0.4% by weight, more particularly 0.08% to 0.25% by weight.

It has been found in accordance with the invention that 2-(N-3,4-dimethylpyrazole)succinic acid (also identified as DMPSA or DMPSA) in a mixture with (thio)phosphoric triamides of the general formula (I) and/or (thio)phosphoric diamides of the general formula (II) produces synergistically active mixtures for the treatment of urea-containing fertilizers.

In accordance with the invention, it has been possible to reduce significantly the customary amounts for use of, respectively, urease inhibitor (component A) and nitrification inhibitor (component B), without significant loss of activity, meaning that the total amount of active compound in the mixture is only about half as great as in the case of use of the individual substances.

As indicated above, the urease enzyme hydrolyzes urea relatively rapidly into ammonia and carbon dioxide. By using urease inhibitors, this process can be retarded or slowed down.

Nitrification inhibitors prevent the premature conversion of nitrogen in fertilizers into nitrate, which can easily be washed out by rainwater, for example, and so lost to the plants.

Typical nitrification inhibitors such as 3,4-dimethylpyrazole or 3,4-dimethylpyrazole phosphate typically raise the ammonia emissions from urea-containing fertilizers significantly, for reasons including the fact that the pH remains in the basic range for longer after the hydrolysis. At the elevated pH levels, the potential for ammonia emission is significantly higher than at lower pH levels. While the use of a nitrification inhibitor is accompanied by a drop in formation of $N_2O$ and by a drop in nitrate leaching, this desired effect is nevertheless bought at the expense of elevated ammonia emissions and hence a loss of nitrogen via ammonia.

Frequently, therefore, a urease inhibitor is used on urea-containing fertilizers, but not a nitrification inhibitor.

It has now been found in accordance with the invention that (thio)phosphoric triamides of the general formula (I) and, respectively, (thio)phosphoric diamides of the general formula (II), especially N-(n-butyl)thiophosphoric triamide (NBPT) or N-(n-propyl)thiophosphoric triamide (NPPT), prevent or limit the emission of ammonia from urea and the additional emissions of ammonia when using 2-(N-3,4-dimethyl-pyrazole)succinic acid as nitrification inhibitor. Accordingly, not only is the nitrification sufficiently inhibited by the nitrification inhibitor employed, and losses of laughing gas are reduced strongly, but also the ammonia losses are strongly reduced, and so the urea is stabilized for longer.

This effect occurs especially when using the nitrification inhibitor of the invention in combination with the urease inhibitors of the invention. Inhibition of nitrification and urease inhibition are retained alongside one another, while at the same time the amount of both active compounds employed is lowered.

Without being tied to any theory, the combination effect may be based on the retarded effect of the nitrification inhibitor coupled with the delayed release of the ammonium nitrogen. 2-(N-3,4-Dimethyl-pyrazole)succinic acid is water-soluble and more polar than other nitrification inhibitors. For an effect to come about, it is typically first necessary for the covalent bond to the succinic acid to be undone in the soil. The onset of effect coincides with the retarded release of ammonium nitrogen, and so the nitrification-inhibiting effect and the urease-inhibiting effect are retained in temporal interengagement and reinforce one another.

The additional use of an amine compound as component C, as taught in WO 2009/079994, can be omitted in accordance with the invention, allowing a saving to be made in terms of this component. It is nevertheless possible in accordance with the invention to make accompanying use of the amine compound of component C. Without being tied to any theory, the use of this basic, polar component can be omitted by virtue of the nitrification inhibitor, which is slightly basic and polar.

Screening trials with DMPSA and NBPT revealed that in the first few days of application, the urease inhibitor sufficiently inhibits the hydrolysis of urea without the nitrification inhibitor having any detrimental effect thereon.

An amount of nitrification inhibitor reduced by up to 70% (relative to an application wherein the nitrification inhibitor is the sole additive) is sufficient to inhibit the nitrification throughout the period of use. Using the urease inhibitor slows down the release of ammonium in the first days after application.

Whereas in the case of sole use, just a third of the usual amount of nitrification inhibitor causes a sharp increase in ammonia emissions, it is not the case for the combination of NBPT. On the other hand, just a third of the customary usage amount of nitrification inhibitor drastically lowers the emissions of laughing gas.

As a result, in the case of joint application of the nitrification inhibitor DMPSA with the urease inhibitor NBPT, the effects of the two inhibitors are retained and reinforce one another in such a way that the total amount in which both active compounds are used can be more than halved.

Relative to the customary amount in which the individual substances are used when employed alone, the amount can be reduced by up to ⅔ for DMPSA (e.g., from 0.36% to 0.12% by weight), for NBPT by up to ⅓ (e.g., from 0.06% to 0.04% by weight), based in each case on urea. Since, normally, DMPSA is used in a substantially greater amount than NBPT, the sharp reduction in the amount thereof is even more significant.

Used as component A is at least one (thio)phosphoric triamide of the general formula (I) and/or (thio)phosphoric diamide of the general formula (II). These may be individual compounds or else mixtures of two or more such compounds. For example, they may be mixtures of the kind described in EP-A-1 820 788.

The radicals $R^1$ and $R^2$ may each be unsubstituted or substituted, by halogen and/or nitro, for example.

Examples of alkyl groups are methyl, ethyl, propyl, isopropyl, n-butyl, isobutyl, sec-butyl, tert-butyl, pentyl, isopentyl, neopentyl, tert-pentyl, hexyl, 2-methylpentyl, heptyl, octyl, 2-ethylhexyl, isooctyl, nonyl, isononyl, decyl and isodecyl. Cycloalkyl groups are, for example, cyclopropyl, cyclobutyl, cyclopentyl, cyclohexyl and cyclooctyl; aryl groups are, for example, phenyl or naphthyl, or, in substituted form, 2-nitrophenyl. Examples of heterocyclic radicals $R_1R_2N$— are piperazinyl, morpholinyl, pyrrolyl, pyrazolyl, triazolyl, oxazolyl, thiazolyl or imidazolyl groups.

Compounds of this kind are known as urease inhibitors from EP 0 119 487, WO 00/58317 and EP 1 183 220, for example.

One example of compounds of the formula (II) is phenyl phosphorodiamidate.

Preferred preparations are those comprising N-n-butyl-thiophosphoric triamide (NBPT) as one or the only one of the active compounds (component A). The further active compound, if used, is preferably a derivative selected from the group consisting of N-cyclohexyl-, N-pentyl-, N-isobutyl- and N-propylphosphoric triamide and corresponding thiophosphoric triamides. Particularly preferred preparations are those containing NBPT in amounts of 40% to 95% by weight, very preferably of 60% to 80% by weight, based in each case on the total amount of active compound of component A.

With particular preference, NBPT alone is used as component A.

Thiophosphoric triamides are known to be relatively easily converted to the corresponding phosphoric triamides. Since, generally speaking, moisture cannot be entirely excluded, thiophosphoric triamide and the corresponding phosphoric triamide are frequency present in a mixture with one another. In this specification, therefore, the term "(thio) phosphoric triamide" identifies not only the pure thiophosphoric triamides and phosphoric triamides, respectively, but also mixtures thereof.

Particular preference is given to N-alkylthiophosphoric triamides (with X=S and R2=H) and N-alkylphosphoric triamides (with X=O and R2=H).

Urease inhibitors of this kind can be prepared, for example, by known methods from thiophosphoryl chloride, primary or secondary amines, and ammonia, as described in U.S. Pat. No. 5,770,771, for example. In such a reaction, in a first step, thiophosphoryl chloride is reacted with one equivalent of a primary or secondary amine, in the presence of a base, and the product is then reacted with an excess of ammonia to give the end product.

Other suitable urease inhibitors are described in WO 00/61522, WO 00/58317, WO 02/083697, WO 01/87898, WO 2006/010389, for example. The compounds described therein are, for example, thiophosphoric triamides, heterocyclically substituted (thio)phosphoric triamides, N-(2-pyrimidinyl) (thio)phosphoric triamides and N-phenylphosphoric triamides.

EP-A-1 820 788 describes more particularly mixtures of N-(n-butyl)thiophosphoric triamide and N-(n-propyl) thiophosphoric triamide.

These mixtures can be used in accordance with the invention, in addition to the individual substances, with particular preference.

The (thio)phosphoric triamides of the general formula (I), and/or (thio)phosphoric diamides of the general formula (II), which are employed as component A, may be pure substances or may be mixtures of two or more pure substances. They may also still contain byproducts from the active compound synthesis process. Generally speaking, the purity of component A is at least 70%.

As component B, the mixture according to the invention comprises 2-(N-3,4-dimethylpyrazole)succinic acid (DMPSA) as pyrazole compound with nitrification-inhibiting effect. This compound is known from the prior art and described for example in WO 96/24566, WO 2011/032904 and WO 2013/121384.

2-(N-3,4-Dimethylpyrazole)succinic acid is frequently an isomer mixture of 2-(3,4-dimethyl-1H-pyrazole-1-yl)succinic acid and 2-(2,3-dimethyl-1H-pyrazole-1-yl)succinic acid, in a ratio of preferably about 80:20. It is also possible to use one of the individual compounds. Likewise possible is the use of salts of said compound(s), examples being alkali metal salts, alkaline earth metal salts or ammonium salts, preferably alkali metal salts.

2-(N-3,4-Dimethylpyrazole)succinic acid may be prepared by any desired suitable processes, which are described for example in general form in WO 96/24566. The preparation is accomplished preferably by reaction of 3,4-dimethylpyrazole with maleic acid or maleic anhydride. This reaction is carried out typically in an acidic environment. Regarding the preparation of 3,4-dimethylpyrazole, reference may be made to Noyce et al., Jour. of Org. Chem. 20, 1955, pages 1681 to 1682. Reference may further be made to EP-A-0 474 037, DE-A-3 840 342 and EP-A-0 467 707, and also to EP-B-1 120 388.

For the purification of the 3,4-dimethylpyrazole, reference may be made to DE-A-10 2009 060 150.

The reaction is performed favorably at temperatures of 0 to 150° C., preferably 50 to 120° C., more particularly 70 to 105° C. under atmospheric pressure in the absence of a solvent or, preferably, in an inert solvent, such as water, acetonitrile or dimethyl sulfoxide. Other suitable solvents are alcohols, ethers, ketones, water, and also alkanes. Reaction in an organic acid such as acetic acid may also be appropriate. The product may be purified by recrystallization, by being taken up with diethyl ether, for example.

It is possible to dissolve maleic anhydride in water and to carry out reaction to form maleic acid. Then an aqueous solution of 3,4-dimethylpyrazole can be added. The reaction may take place, for example, at temperatures around 100° C., as for example at 70 to 105° C. Since, under the reaction conditions in which the reaction is normally carried out, 3,4-dimethyl-pyrazole is tautomerized, or the 3,5-tautomerism of the pyrazole ring is negated by the substitution on the nitrogen, it is generally not possible to avoid having isomer mixtures of the resulting substituted succinic acid, containing structural isomers.

With particular preference, the 2-(N-3,4-dimethyl-pyrazole)succinic acid is prepared by reaction of 3,4-dimethylpyrazole with maleic acid, maleic anhydride or maleic acid/maleic anhydride mixtures in the absence of organic solvents or diluents with subsequent crystallization from the resultant reaction product in the absence of organic solvents or diluents.

It has been found in accordance with the invention that the product is obtained in high purity and yield if no organic solvents or diluents are used in the course of preparation and crystallization.

The presence of small amounts of organic solvents or diluents in the reaction or crystallization can be tolerated. In accordance with the invention up to 10%, more preferably up to 5%, more particularly up to 2.5% by weight of organic solvents or diluents can be tolerated, based on nonorganic solvents or diluents used in the process. With particular preference, organic solvents or diluents are shunned entirely in the course of the reaction and crystallization.

The reaction is preferably carried out in water as solvent, and the crystallization takes place from the aqueous reaction product.

It is possible here to react aqueous solutions or pastes of 3,4-dimethylpyrazole and/or maleic acid and/or maleic anhydride. With particular preference both 3,4-dimethylpyrazole and maleic acid (or anhydride) are employed in the form of aqueous solutions or pastes.

The crystallization takes place preferably by cooling of the aqueous reaction product. Here it is possible to use seed crystals in order to initiate the crystallization.

The 2-(N-3,4-dimethylpyrazole)succinic acid obtained after the crystallization preferably has a purity of at least 99.7%, more preferably at least 99.9%. This purity is preferably achieved as early as after the first crystallization.

By using the reaction product of 3,4-dimethylpyrazole with maleic acid it is possible to lower sharply the volatility of the 3,4-dimethylpyrazole.

Besides components A and B, it is possible optionally for component C to be used as well. Preferably, however, no component C is used.

The fraction of components A and B in the mixture according to the invention is preferably 70% to 100%, more preferably 90% to 100%, by weight. Component A is present in a weight ratio to component B of 1:1 to 1:6, preferably 1:1.5 to 1:5, more particularly 1:2 to 1:4.5, especially 1:2.5 to 1:4.

In accordance with the invention it is not necessary to react component B chemically with component A, as is described, for example, in DE-A-10 2006 015 362. As a result, the amounts of components A and B can be varied to a substantially broader extent, and tailored to the respective area of application.

It is therefore preferred for components A and B to be used separately.

It has been found in accordance with the invention that the combination of 2-(N-3,4-dimethylpyrazole)succinic acid with component A leads to an effective nitrification inhibitor in urea-containing fertilizers, an inhibitor which as well as the aforementioned advantages in terms of storage, and also after delivery onto the soil, exhibits a reduced volatility or a reduced loss.

Furthermore, 2-(N-3,4-dimethylpyrazole)succinic acid has been found as a particularly effective nitrification inhibitor with low volatility and low toxicity. The present invention therefore provides the specific combination of 2-(N-3,4-dimethyl-pyrazole) succinic acid with component A.

It has proven appropriate to use mixtures of component A, especially NBPT, and 2-(N-3,4-dimethyl-pyrazole) succinic acid with a urea-containing fertilizer. Fertilizer mixtures of this kind contain preferably 100 to 3000 ppm by weight, based on the urea in the fertilizer, of nitrification inhibitor (0.01% to 0.3% by weight), more preferably 0.03% to 0.2% by weight of DMPSA, more particularly 0.04% to 0.18% by weight of DMPSA.

The urea-containing fertilizer mixtures contain preferably 100% to 800% by weight ppm, based on the fertilizer, of component A (0.01% to 0.08% by weight), more preferably 0.01% to 0.07% by weight, more particularly 0.018% to 0.06% by weight of component A, especially NBPT.

In the fertilizer, components A and B are preferably in a weight ratio in the range from 1:1 to 1:6, more preferably 1:1.5 to 1:5, more particularly 1:2 to 1:4.5, especially 1:2.5 to 1:4.

Having proven particularly appropriate on account of their good long-term activity are fertilizer mixtures produced according to the following method:

Granules of fertilizers are impregnated or coated with 2-(N-3,4-dimethylpyrazole)succinic acid, by being sprayed with a solution of the nitrification inhibitor and dried again. The method is known, for example, from DE-A-41 28 828, hereby referenced in full. The sealing of the impregnated granules with a paraffin wax, which is an additional proposal in the latter document, is generally unnecessary, owing to the substantially lower volatility of the nitrification inhibitor of the invention.

The 2-(N-3,4-dimethylpyrazole)succinic acid may also be added during the actual production of the fertilizer, in the slurry, for example.

If necessary, the mineral fertilizer may also be treated with polyacids, as is described in WO 98/05607/EP-B-0 971 526.

The nitrification inhibitors are customarily applied to the soil in amounts of 100 g/ha to 10 kg/ha. In accordance with the invention this amount can be reduced to 30 g/ha to 3 kg/ha.

Delivery in liquid fertilizer formulations may be accomplished, for example, by fertigation with or without excess water, as described in DE-C-102 30 593.

In the context of its use as a nitrification inhibitor, the 2-(N-3,4-dimethylpyrazole)succinic acid, which can be prepared in a simple way from inexpensive starting products, is notable in particular for the fact that it effectively inhibits the nitrification of ammonium nitrogen in the soil over a long period of time.

A further factor is that this compound possesses favorable toxicological properties, has a low vapor pressure, and is sorbed well in the soil. A consequence of this is that 2-(N-3,4-dimethylpyrazole)succinic acid neither is emitted to the atmosphere by sublimation to any significant extent, nor is easily leached by water. As a result, first of all, economic advantages arise, such as high profitability in view of the longer-lasting effect of the nitrification inhibitor, and, moreover, environmental advantages such as a reduction in the burdening of air (climate gas-reducing) and of surface waters and groundwater. In the soil, the speed with which 2-(N-3,4-dimethylpyrazole)succinic acid diffuses is similar to that of nitrate or ammonium, and it can therefore act optimally.

In addition to components A and B, optionally, component C may be used as well.

Component C comprises at least one amino group, e.g., primary, secondary or tertiary amino group, it being possible for any desired further functional groups and radicals, such as hydroxyl, halogen, carboxyl, carbamoyl, carbonyl, oxyalkyl, mercapto, M-sulfido, sulfoxy, sulfo, phospho, siloxy, amino, amido, imino, imido, oxyamido groups, etc., to be present in the compound. Component C is elucidated in more detail below, as an amine by way of example. The statements also apply generally to component C.

The active compound of component A has only a limited storage life. The higher the temperature, the shorter the storage life. If, for example, urea is stored under tropical conditions, more than 60% of the active compound has undergone decomposition after storage for around four weeks, generally speaking. For the marketing of the urea stabilized with the active compound, however, it is frequently vital to apply the active compound to urea and to store the treated fertilizer pending its delivery.

It has been found in accordance with the invention that the active compound applied to urea, of component A, often has a significantly higher storage life (at least 2-3 months) when used in combination with at least one amine having a boiling point of more than 100° C., as component C. This amine of component C preferably has a boiling point of more than 150° C., more preferably of more than 200° C. at ambient pressure (1 bar). The amines in question may be primary, secondary or tertiary amines or polyamines which carry two or more of these amino groups. As amines it is preferred to use secondary and/or tertiary amines. Particular preference is given to using tertiary amines, which may also be present in polymeric form. It is preferred to use those amines which do not enter into any chemical reaction with the active compound of component A or with a solvent of component C, which is optionally used as well. By way of example, the amines of component C are selected from methyldiethanolamine, tetrahydroxypropylethylenediamine, trimethylaminoethylethanolamine, N,N,N',N'-tetramethyl-1,6-hexanediamine, N,N',N''-tris(dimethylaminopropyl)hexahydrotriazine, 2,2'-dimorpholinyldiethyl ether or mixtures thereof.

Component C is used in an amount which is sufficient to increase the storage life of the active compound of component A on urea-containing fertilizers. Component C ought preferably to be used in at least 0.2 times the molar amount of component A, more preferably in 0.5 to 3 times the molar amount, more particularly in 1 to 2 times the molar amount.

Amines having a high boiling point are advantageous in the application for reasons of odor and of protection against explosion, as well.

Very surprisingly, amides, such as N-methylpyrrolidone (NMP), for example, show no stabilizing action.

The stabilizing effect is independent of the accompanying use of a solvent. The addition of amine displays a stabilizing effect both when NMP is used and when alkylenediols such as 1,2-propanediol are used as solvent.

Through addition of polymeric auxiliaries it is possible, furthermore, to increase the stabilizing effect still further.

The mixtures according to the invention may comprise only components A, B and preferably also C. In that case, for example, component C may possibly serve as a solvent for component A, resulting in a liquid or easily meltable composition. It is also possible in accordance with the invention to use solid mixtures of components A, B and optionally C, and also mixtures in emulsion or dispersion form.

According to one embodiment of the invention, the mixture may further comprise a solvent for the (thio)phosphoric triamides, as component D. In that case it is possible to use all suitable solvents.

Solvents contemplated are generally those compounds which are polar and hence have sufficient solvency for component A. They ought preferably to have a sufficiently high boiling point, and so, on application, the evaporation of substantial quantities of solvents is unlikely. Examples of suitable solvents are alcohols, amines, carboxylic acid derivatives such as esters, amides, urea derivatives, halogenated compounds, substituted aromatics, and mixtures thereof. Suitable solvents are described in EP-A-1 820 788, for example. Suitable solvents may be water, alcohols, glycols and also NMP or dimethyl phthalate. Examples of suitable liquid formulations are found in WO 07/22568. Described therein are solvents based on glycols or glycol derivatives. Examples of suitable glycols are propylene glycol and dipropylene glycol. The glycols may be described generally as terminal C2-10 alkylenediols. Examples of other glycols are neopentyl glycol, pinacol, 2,2-diethyl-1,3-propanediol, 2-ethyl-1,3-hexanediol, 2-ethyl-2-butyl-1,3-propanediol, isobutene glycol, 2,3-dimethyl-1,3-propanediol, 1,3-diphenyl-1,3-propanediol, 3-methyl-1,3-butanediol. Examples of cyclic glycols are 1,4-cyclohexanedimethanol and p-xylylene glycol. Examples of polyglycols are polyethylene glycol and polypropylene glycols. Suitable derivatives may be esters such as stearates or caprylates. Use may also be made, for example, of glycerol or glycerol esters. Other suitable additional solvents may be liquid amides, 2-pyrrolidone and N-alkyl-2-pyrrolidones such as NMP. One preferred solvent is dimethyl phthalate. Preferably no such solvent is used.

As an alternative it is also possible to use solid formulations, which as well as the mixture may comprise adjuvants such as fillers, binders or granulating assistants such as lime, gypsum, silicon dioxide or kaolinite. Mixtures according to the invention may at the same time, in addition to components A and B, also comprise solvents or solvent mixtures and adjuvants, and may take the form of a suspension.

In accordance with the invention there may be a further component E present in the mixtures, comprising polymers in dissolved or dispersed form. Preferred polymers in that case are those which do not enter into any chemical reactions with components A and B. The polymers may be in solution, in emulsion or in dispersed form. It is preferred to use soluble polymers, which preferably have a number-average molecular weight of at least 5000. Suitable polymers may originate from vinylic monomers, as for example from styrenes or (meth)acrylates or acrylonitrile. It is possible, by way of example, to use soluble polystyrenes, soluble polystyrene-acrylonitrile polymers, or else polymers of this kind comprising graft rubbers. Polyesters or polyalkylene glycols, for example, may additionally be used. The stabilization of the urease inhibitors of component A is further improved by the addition of the polymers. They may also be used for delayed, controlled release of the mixture. The constituents are present in the mixture preferably in amounts as given below.

The fraction of the amine of component C in the mixture according to the invention, where present, is preferably 1% to 50%, more preferably 2% to 40%, more particularly 3% to 35% by weight. Where a solvent is used as well, as component D, the fraction of the solvent in the mixture is preferably 10% to 94%, more preferably 20% to 88%, more particularly 30% to 82% by weight. The amount of the optional polymer component E is preferably 0% to 70%, more preferably 0% to 50%, more particularly 0% to 25% by weight. When component E is present, the amount is preferably 0.5% to 70%, more preferably 1% to 50%, more particularly 2% to 25% by weight. The total amount of components A, B and optionally C, D and E makes 100% by weight.

The mixtures according to the invention can be prepared by simple mixing of components A, B and, where used, C to E. This mixing may also be carried out at an elevated temperature of 30 to 60° C., for example. The sequence in which the individual components are added in this procedure is arbitrary. Where a solvent is used as well, typically, first components A and B and optionally C are dissolved in the solvent, and then the polymer of component E is introduced. Where it is necessary to heat the mixtures in the course of the preparation process, it is preferred to add component A last.

The mixtures according to the invention are used as an additive or coating material for urea-containing nitrogen fertilizers.

As an additive they may be delivered before, after or together with a urea-containing nitrogen fertilizer. The mixture according to the invention may in that case be metered separately from the urea-containing nitrogen fertilizer. More frequently, the mixture according to the invention is incorporated into the urea-containing nitrogen fertilizer, in a melt, for example, or is applied as a coating material to the urea-containing nitrogen fertilizer. Where they are used accompanyingly as an additive for urea-containing nitrogen fertilizers, the mixtures according to the invention are employed preferably in an amount of 0.001% to 0.5% by weight, based on the weight of the urea in the nitrogen fertilizer and on components A and B in the mixtures.

In parallel with the improvement of the utilization of nitrogen in the urea-containing, mineral and organic fertilizers, the use of these compositions has the effect that there is an increase—in some cases considerably—in the yields or production of biomass of crop plants.

Equally, the mixtures according to the invention may be added to organic fertilizers, such as liquid manure, for example, during the actual storage of such fertilizers, in order thus to prevent nitrogen nutrient losses, by virtue of decelerated conversion of the individual forms of nitrogen into gaseous nitrogen compounds, which are therefore volatile, and in order as a result, at the same time, to contribute to a lowering of the ammonia load in animal stalls. Moreover, the mixtures according to the invention may be used on agricultural stovers and grazed land for the purpose of reducing gaseous nitrogen losses and for preventing instances of nitrate leaching.

The mixtures according to the invention may exhibit an unexpectedly high biological activity and may lead to extremely high yield increase rates.

In this context it is immaterial whether the compositions of the invention are incorporated, by melting, for example, into the fertilizer, or else are applied in a form applied to the fertilizer surface or applied separately from the delivery of the fertilizer, in the form, for example, of a (suspension) concentrate, a solution or a formulation.

It is particularly preferred in accordance with the invention to use the mixtures according to the invention as coating materials for urea-containing nitrogen fertilizers.

The invention also provides a urea-containing fertilizer comprising a mixture as described above in an amount such that the total amount of components A and B, based on the urea present, is 0.02% to 0.38% by weight. The amount of components A and B, based on the urea present, is more preferably 0.04% to 0.27% by weight, more particularly 0.058% to 0.24% by weight. In the urea-containing fertilizer, the mixture is preferably applied to the surface of the urea-containing fertilizer.

By a urea-containing fertilizer is meant, first of all, urea itself. In customary commercial fertilizer quality, this urea has a purity of at least 90%, and may for example be in crystalline, granulated, compacted, prilled or ground form. In addition, the term is also intended to encompass mixtures of urea with one or more further nitrogen fertilizers such as ammonium sulfate, ammonium nitrate, ammonium chloride, cyanamide, dicyandiamide (DCD) or calcium nitrate, and also slow-release fertilizers, examples being urea-formaldehyde, urea-acetaldehyde or urea-glyoxal condensates. Also included, furthermore, are urea-containing multinutrient fertilizers which as well as nitrogen also comprise at least one further nutrient such as phosphorus, potassium, magnesium, calcium or sulfur. Also present as well may be the trace elements boron, iron, copper, zinc, manganese or molybdenum. Urea-containing multinutrient fertilizers of this kind may likewise be in granulated, compacted, prilled or ground form or in the form of a crystal mixture. Also encompassed, furthermore, are liquid, urea-containing fertilizers, such as ammonium nitrate-urea solution or else liquid manure, slurry and digestate from biogas production. The urea-containing fertilizers may further comprise one or more other active compounds such as, for example, nitrification inhibitors, herbicides, fungicides, insecticides, growth regulators, hormones, pheromones or other plant protection agents or soil adjuvants in amounts from 0.01% to 20% by weight.

The fertilizers of the invention are obtainable by mixing the mixtures according to the invention, in either liquid or solid form, with the urea-containing fertilizer, or incorporating them into it by granulation, compacting or prilling, by addition to a corresponding fertilizer mixture or to a mash or melt. With particular preference the mixtures according to the invention are applied to the surface of existing granules, compacts or prills of the urea-containing fertilizers, by means of spraying, powder application or impregnating, for example. This can also be done using further auxiliaries such as adhesion promoters or encasing materials. Examples of apparatuses suitable for performing such application include plates, drums, mixers or fluidized-bed apparatus, although application may also take place on conveyor belts or their discharge points or by means of pneumatic conveyors for solids. A concluding treatment with anticaking agents and/or antidust agents is likewise possible. The fertilizers of the invention, or mixtures, are used in the context of fertilization with urea-containing fertilizers. Application takes place preferably to an agriculturally or horticulturally exploited plot.

The invention is illustrated by the examples which follow.

EXAMPLES

In the examples below, the following abbreviations have the following meanings:
NBPT N-(n-butyl)thiophosphoric triamide=urease inhibitor UI
DMPSA 2-(N-3,4-dimethylpyrazole)succinic acid=nitrification inhibitor NI

EXAMPLES

A. Preparation Examples for 2-(N-3,4-dimethyl-pyrazole) succinic acid (DMPSA)

Example 1

9.6 g of 3,4-dimethylpyrazole (0.1 mol) and 9.8 of maleic anhydride (0.1 mol) were heated in 50 ml of 50% acetic acid to 100° C. After 16 hours, the reaction mixture was evaporated to dryness. When the residue is taken up in diethyl ether, the product (2-(N-3,4-dimethylpyrazole)succinic acid) precipitates in pure form and is isolated by filtration: white crystals in a yield of 92%. In the NMR spectrum there are a number of methyl signals apparent, which is in agreement with the elimination of the 3,5-tautomerism as a result of the substitution on nitrogen.

Example 2: Preparation on the 200 kg Scale

Starting materials used for the experiments were maleic anhydride from CVM with a purity of more than 99.5%, and an 80% aqueous solution of 3,4-dimethylpyrazole (3,4-DMP) from BASF SE. According to the NMR spectrum, the solution of 3,4-DMP used contained about 2% of otherwise uncharacterized impurities.

The experiments were first conducted in a 20 L reaction vessel, which in further experiments was replaced by a 25 L reaction vessel.

In the first experiment, 41.608 mol of maleic anhydride were introduced and were dissolved in 11 liters of distilled water. During this procedure, the temperature rose by 10° C. Then 41.608 mol of 80% 3,4-dimethyl-pyrazole solution were added, the temperature rising by a further 12° C. When the addition was over, the reaction mixture was heated to an internal temperature of 100° C. When this temperature was reached, the reaction mixture was stirred at 100° C. for 24 hours and then allowed to cool. After the reaction mixture had cooled to 90° C., a sample was taken for reaction monitoring by NMR spectroscopy, and the reaction mixture was subsequently seeded with 1 g of product (crystals of 2-(N-3,4-dimethylpyrazole)succinic acid. At this temperature there was as yet no crystallization, but the crystals added also no longer dissolved. On further cooling, starting at around 85° C., crystallization slowly began. The major amount of the product only crystallized at just below 80° C. with an increase in temperature. For complete crystallization, the reaction mixture was left to cool overnight with stirring. The precipitated solid was isolated by filtration using three 8 l G3 glass suction filters, using a suction flask and membrane pump, under reduced pressure, then washed with a total of 8 liters of distilled water, and subsequently dried under reduced pressure at a bath temperature of 60° C. The dried product thus obtained was placed into a vessel, thoroughly mixed, and sampled for investigation by NMR spectroscopy. In the subsequent experiments, in place of the distilled water, a corresponding amount of the combined filtrates was used as the reaction medium. The excess quantity of the combined filtrates was discarded.

Monitoring of the reaction by NMR spectroscopy after 24 hours revealed a relatively constant conversion of around 92% with a relatively constant isomer ratio P1/P2 (2-(3,4- dimethyl-1H-pyrazol-1-yl)succinic acid/2-(2,3-dimethyl-1H-pyrazol-1-yl)succinic acid) of around 3.3. The ratio was slightly higher only at the start of the serial experiment. However, that was also to have been expected, since the use of the filtrate instead of the distilled water as reaction medium introduced a larger amount of P2 (P1/P2 ratio in the filtrates is around 1.0) into the subsequent experiments.

The composition of the reaction mixture after a reaction time of 24 hours attained constant values after just a few experiments. Similarly, the compositions of the products isolated in the individual experiments differ only slightly from one another.

The solids, obtained on average with a yield of 90.22%, possessed a purity of 99.9% and an isomer ratio on average of 4.0 (2-(3,4-dimethyl-1H-pyrazol-1-yl)succinic acid to 2-(2,3-dimethyl-1H-pyrazol-1-yl)succinic acid). Impurities of 3,4-DMP, maleic acid and rac-malic acid were undetectable or detectable only in traces (<0.1%) in the 1H NMR spectra.

B. Use Examples

Screening trials were conducted to evaluate the effect of DMPSA and NBPT in the inhibition of urease and inhibition of nitrification, and to find suitable quantities for use. Serving for this purpose was a two-factorial trial design including an unfertilized control sample. For the urease inhibitor NBPT and for the nitrification inhibitor DMPSA, in each case 0%, 33%, 66% and 100% of the application rates recommended for the individual compounds when used alone were used (in this example, 0.6 g of NBPT per kg of urea and, respectively, 3.6 g of DMPSA per kg of urea), giving 16 trials (0%-0% to 100%-100%), in addition to the unfertilized control sample.

Urea fertilizer was delivered in an amount of 200 kg nitrogen per ha, corresponding to 0.51 mg of urea nitrogen per g of soil. The soil used was Filder loam with a pH of 6.8. The incubation trials were carried out at 20° C. For the investigation of trace gases, air supply was passed first through a gas sample, then through a 250 ml capacity glass bottle containing 150 g of soil, subsequently through a gas sample for the outgoing air and through an acid trap, in order, for example, to determine amounts of ammonia. For the measurement of nitrogen, about 20 g of soil were incubated; for the measurement of urea, about 5 g of soil.

The percentages of the active compounds are based on the normal application rate when using only one of the components (NI or UI).

1. Results—Ammonium
% of applied urea (13 mg N)
A determination was carried out 28 days after application of the urea, with the percentage recovery in the form of ammonium being reported.

|                 |    | UI |     |     |    |
| --------------- | -- | -- | --- | --- | -- |
| Days after appl.| 28 | 0  | 1/3 | 2/3 | 1  |
| NI              | 0  | 1  | 9   | 21  | 28 |
|                 | 1/3| 62 | 66  | 67  | 70 |
|                 | 2/3| 63 | 66  | 66  | 66 |
|                 | 1  | 69 | 68  | 68  | 80 |

From the results it is apparent that 33% of DMPSA are sufficient to inhibit nitrification throughout the trial. NBPT had no supplementary influence after 28 days.

2. Results—Nitrate
% of the urea applied (13 mg N)
5 Days after Application:

|                 |   | UI |     |     |    |
| --------------- | - | -- | --- | --- | -- |
| Days after appl.| 5 | 0  | 1/3 | 2/3 | 1  |
| NI              | 0 | 16 | 10  | 11  | 11 |
|                 |1/3| 4  | 6   | 6   | 6  |
|                 |2/3| 5  | 6   | 5   | 6  |
|                 | 1 | 6  | 5   | 5   | 5  |

28 Days after Application:

|                 |    | UI |     |     |    |
| --------------- | -- | -- | --- | --- | -- |
| Days after appl.| 28 | 0  | 1/3 | 2/3 | 1  |
| NI              | 0  | 57 | 58  | 64  | 52 |
|                 |1/3 | 20 | 15  | 14  | 15 |
|                 |2/3 | 17 | 17  | 14  | 16 |
|                 | 1  | 14 | 19  | 14  | 20 |

In the results it is apparent that 33% of the DMPSA is sufficient to inhibit nitrification during the entire period.

3. Results—Ammonia Emission
% of the urea applied (77 mg N)
4 Days after Application:

|                 |    | UI  |     |     |     |
| --------------- | -- | --- | --- | --- | --- |
| Days after appl.| 4  | 0   | 1/3 | 2/3 | 1   |
| NI              | 0  | 0.3 | 0.3 | 0.1 | 0.0 |
|                 |1/3 | 0.6 | 0.0 | 0.0 | 0.0 |
|                 |2/3 | 0.9 | 0.0 | 0.1 | 0.2 |
|                 | 1  | 0.7 | 0.0 | 0.0 | 0.4 |

9 Days after Application:

|                 |    | UI  |     |     |     |
| --------------- | -- | --- | --- | --- | --- |
| Days after appl.| 9  | 0   | 1/3 | 2/3 | 1   |
| NI              | 0  | 1.3 | 1.1 | 0.2 | 0.0 |
|                 |1/3 | 3.7 | 1.1 | 0.2 | 0.0 |
|                 |2/3 | 2.4 | 1.2 | 0.2 | 0.0 |
|                 | 1  | 2.2 | 0.8 | 0.2 | 0.0 |

From the results it is apparent that with an increasing fraction of NBPT it is possible to reduce the ammonia losses. At just 66% NBPT there was a notable and almost complete reduction in ammonia emissions, especially 9 days after application.

The addition of DMPSA causes the ammonia emissions to rise.

By addition of NBPT it was possible to prevent the increase in ammonia emission by the nitrification inhibitor.

4. Results—Laughing Gas
77 mg N applied
Results—$N_2O$—N cumulative

| | μg N₂O—N Bottle[1] | | | | | | | | |
|---|---|---|---|---|---|---|---|---|---|
| Days after appl. | UI-0_NI-0 2 | UI-0_NI-1 3 | UI-0_NI-2 4 | UI-0_NI-3 5 | UI-1_NI-0 6 | UI-1_NI-1 7 | UI-1_NI-2 8 | UI-1_NI-3 9 | UI-2_NI-0 10 |
| 0 | 0 | 0 | 0 | 0 | 0 | 0 | 0 | 0 | 0 |
| 0.5 | 0 | 0 | 0 | 0 | 0 | 1 | 0 | 2 | 0 |
| 1 | 1 | 3 | 1 | 1 | 2 | 2 | 2 | 3 | 1 |
| 2 | 4 | 3 | 1 | 1 | 3 | 4 | 2 | 3 | 2 |
| 3 | 10 | 4 | 2 | 1 | 4 | 5 | 2 | 4 | 3 |
| 4 | 17 | 4 | 2 | 2 | 5 | 5 | 2 | 4 | 3 |
| 5 | 23 | 4 | 2 | 2 | 7 | 5 | 2 | 4 | 4 |
| 6 | 45 | 5 | 2 | 2 | 16 | 8 | 3 | 5 | 8 |
| 8 | 59 | 6 | 3 | 3 | 32 | 11 | 5 | 5 | 16 |
| 10 | 83 | 5 | 3 | 2 | 48 | 11 | 5 | 5 | 36 |
| 12 | 115 | 5 | 3 | 3 | 75 | 13 | 5 | 5 | 67 |
| 14 | 141 | 6 | 3 | 3 | 122 | 14 | 6 | 7 | 125 |
| 17 | 152 | 6 | 3 | 3 | 144 | 15 | 6 | 7 | 145 |
| 18 | 172 | 5 | 1 | 2 | 179 | 15 | 4 | 6 | 190 |
| 20 | 211 | 5 | 2 | 2 | 203 | 12 | 2 | 4 | 215 |
| 22 | 264 | 7 | 3 | 2 | 238 | 13 | 2 | 3 | 249 |
| 24 | 320 | 7 | 4 | 3 | 343 | 12 | 3 | 6 | 312 |
| 28 | 371 | 8 | 6 | 4 | 497 | 12 | 2 | 6 | 397 |
| % of appl. | 0.48 | 0.01 | 0.01 | 0.00 | 0.65 | 0.02 | 0.00 | 0.01 | 0.52 |

| | μg N₂O—N Bottle[1] | | | | | | |
|---|---|---|---|---|---|---|---|
| Days after appl. | UI-2_NI-1 11 | UI-2_NI-2 12 | UI-2_NI-3 13 | UI-3_NI-0 14 | UI-3_NI-1 15 | UI-3_NI-2 16 | UI-3_NI-3 17 |
| 0 | 0 | 0 | 0 | 0 | 0 | 0 | 0 |
| 0.5 | 0 | 0 | 0 | 0 | 0 | 1 | 1 |
| 1 | 1 | 2 | 1 | 2 | 1 | 2 | 4 |
| 2 | 2 | 2 | 1 | 7 | 1 | 4 | 8 |
| 3 | 2 | 2 | 1 | 10 | 1 | 5 | 11 |
| 4 | 2 | 2 | 1 | 11 | 1 | 5 | 13 |
| 5 | 2 | 2 | 1 | 12 | 1 | 6 | 14 |
| 6 | 5 | 3 | 2 | 13 | 2 | 8 | 18 |
| 8 | 4 | 3 | 3 | 20 | 3 | 8 | 20 |
| 10 | 4 | 3 | 5 | 31 | 4 | 10 | 23 |
| 12 | 4 | 3 | 4 | 52 | 3 | 10 | 23 |
| 14 | 5 | 2 | 5 | 90 | 4 | 13 | 25 |
| 17 | 5 | 2 | 5 | 99 | 4 | 14 | 26 |
| 18 | 4 | 3 | 5 | 125 | 7 | 13 | 28 |
| 20 | 2 | 1 | 3 | 141 | 4 | 11 | 26 |
| 22 | 4 | 3 | 6 | 156 | 7 | 12 | 26 |
| 24 | 9 | 6 | 11 | 174 | 7 | 12 | 28 |
| 28 | 13 | 5 | 12 | 194 | 7 | 11 | 29 |
| % of appl. | 0.02 | 0.01 | 0.02 | 0.25 | 0.01 | 0.01 | 0.04 |

From the results it is apparent that just 33% of DMPSA drastically reduces the emissions of laughing gas.

From the results it is apparent overall that the combination of 33% of the usual amount of DMPSA with 66% to 100% of the usual amount of NBPT leads to an optimum effect. Nitrification is adequately inhibited, laughing gas losses and ammonia losses are sharply reduced, and the urea is stabilized for longer.

The invention claimed is:

1. A mixture for the treatment of urea-containing fertilizers, comprising component A and component B, wherein component A comprises:
   a) at least one (thio)phosphoric triamide of the general formula (I)

$R^1R^2N-P(X)(NH_2)_2$  (I)

wherein
   X is oxygen or sulfur,
   $R^1$ is $C_{1-10}$ alkyl or $C_{3-10}$ cycloalkyl, and
   $R^2$ is hydrogen,
   and component B comprises:
   b) a salt of 2-(N-3,4-dimethylpyrazole)succinic acid, where component A and component B are in a weight ratio in a range from 1:1.5 to 1:5.

2. The mixture of claim 1, wherein component A comprises N-(n-butyl)thiophosphoric triamide (NBPT) or N-(n-propyl)thiophosphoric triamide (NPPT).

3. The mixture of claim 2, wherein component A is N-(n-butyl)thiophosphoric triamide.

4. The mixture of claim 1, wherein the salt of 2-(N-3,4-dimethylpyrazole)succinic acid is selected from the group consisting of alkali metal salts, alkaline earth metal salts, and ammonium salts.

5. The mixture of claim 4, wherein the salt of 2-(N-3,4-dimethylpyrazole)succinic acid is an alkali metal salt.

6. The mixture of claim 1, wherein component A and component B are in a weight ratio in the range from 1:2 to 1:4.5.

7. The mixture of claim 1, wherein component A and component B are in a weight ratio in the range from 1:2.5 to 1:4.

8. The mixture of claim 1, further comprising component C, wherein component C comprises:
   c) at least one compound containing an amino group or a substituted amino group and having a boiling point of more than 100° C., selected from methyldiethanolamine, tetrahydroxypropylethylenediamine, trimethylaminoethylethanolamine, N,N,N',N'-tetramethyl- 1,6-hexanediamine, N,N',N"-tris(dimethylaminopropyl)hexahydrotriazine, 2,2'-dimorpholinyldiethyl ether, or mixtures thereof in at least 0.2 times the molar amount of component A.

9. The mixture of claim 1, further comprising:
   (x) component D, wherein component D comprises a solvent for the (thio)phosphoric triamides, and/or
   (y) component E, wherein component E comprises a polymer in dissolved or dispersed form.

10. The mixture of claim 1, further comprising component C, component D, and component E, wherein:
    component C comprises at least one amine having a boiling point of more than 100° C.,
    component D comprises a solvent for the (thio)phosphoric triamides, and
    component E comprises a polymer in dissolved or dispersed form, wherein each of component A, component B, component C, component D, and component E form 100% by weight of the mixture.

11. A method for reducing the nitrogen losses in a soil treated with a fertilizer, said method comprising delivering the mixture of claim 1 in the form of a formulation, solution or dispersion to the soil separately or simultaneously to the fertilizer.

12. A method for reducing the nitrogen losses or lowering ammonia load in a substrate, said method comprising delivering the mixture of claim 1 to the substrate, wherein the substrate is an organic fertilizer, harvest refuse, grazed land, liquid manure, or an animal stall.

\* \* \* \* \*